3,183,124
METHOD OF MAKING A FUEL CELL ELECTRODE
Raymond J. Jasinski, Milwaukee, Wis., assignor to Allis-Chalmers Manufacturing Company, Milwaukee, Wis.
No Drawing. Filed Mar. 19, 1962, Ser. No. 180,850
1 Claim. (Cl. 136—122)

This invention relates generally to fuel cells and more particularly to improved components for fuel cells and the like and to novel methods of making the same.

Much of the effort being expended in fuel cell research is directed toward the development of catalyst activated fuel cell electrodes which do not require the use of costly noble metals, especially platinum and palladium, as the catalyst materials and yet do not sacrifice the output characteristics which the noble metals obtain. Heretofore, electrodes carrying catalytic platinum have been generally preferred for obtaining maximum output characteristics in the gaseous fuel cells such as disclosed by Mond et al., U.S. 409,365, and in the liquid-gas fuel cells which employ an aqueous soluble fuel. However, the cost of using such clear materials has been a major factor in preventing fuel cells from attaining commercial acceptance in other than governmental work.

A further problem which arises in connection with the design of the fuel electrode (herein called "anode") for both the gas and the liquid-gas system has been to find an electrode which will activate the fuel but which will not be flooded by the liquid electrolyte which is disposed adjacent thereto.

The present invention is predicated upon my improved method of making a fuel cell electrode which not only attains commercially practicable outputs but which does so with an adherent catalyst of a non-noble metal which, as treated in accordance with my unique sequence, has the further characteristic of rendering the electrode hydrophobic. Thus, an electrode manufactured in accordance with the present invention is equally suited for use with both gaseous and aqueous soluble fuels.

Accordingly, one of the primary objects of the present invention is the provision of a novel electrode structure which is readily prepared and which is significantly less costly than those prior art electrodes heretofore utilizing noble metal catalysts.

Another object of the present invention is the provision of an improved electrode which is equally well suited for use with fuel cells employing both gaseous and aqueous soluble fuels.

It is still a further object of the present invention to provide an improved method of preparing fuel cell electrodes in which the catalytic active agent is formed directly on and in the electrode base structure.

A still further object of the present invention is the provision of a novel method of preparing a fuel cell electrode in which the catalyst is deposited upon an electrode base and thereafter calcined whereupon a highly reactive hydrophobic electrode is created.

Still another object of the present invention is to provide a unique method of manufacturing catalytically active hydrophobic gas permeable electrodes in which porous electrically conductive electrode bases have a plurality of catalytic centers disposed therein and thereon consisting of calcined borides selected from the group consisting of the borides of nickel and cobalt.

These and still further objects, as shall hereinafter appear, are attained by the present invention in a remarkably unexpected fashion as can be discerned from the following detailed description of embodiments exemplifying the present invention.

In practicing the present invention, a porous electrode base formed of a suitable electrically conductive material such, for example, as carbon or nickel, is immersed into and substantially saturated by a solution containing a soluble salt of a metal selected from the group consisting of nickel, cobalt, and mixtures thereof. Suitable soluble salts for forming an aqueous solution for this purpose include the chlorides, acetates, bromides, and nitrates of both cobalt and nickel as well as mixtures of these with each other or with other soluble salts.

The electrode base, thus substantially saturated, is removed from the salt solution and dipped into a second solution containing a borohydride selected from the group consisting of the alkali metals, that is, sodium, potassium, lithium, cesium, and rubidium, or a mixture of at least two of these. Of these, only lithium, sodium and potassium are available commercially and, because of lithium's high reactivity, sodium and potassium are preferred.

As soon as the electrode base enters this second solution, a reaction commences between the aqueous salt, for example, nickel acetate, and the borohydride, for example, potassium borohydride. The reaction products are potassium acetate, potassium borate (both soluble salts), hydrogen (which passes off) and nickel boride which forms in and on and adheres to the electrode base. The electrode base is then removed from the second solution and rinsed in a bath to remove the soluble salts and any unreacted borohydride that may cling to the base. Because of the great disparity in solubility between the salt and the nickel (or cobalt) boride, water may be used for a rinsing medium.

Next I place the rinsed electrode into a nonoxidizing oven, that is, an oven having a controlled atmosphere of an inert gas such for example as argon or of a reducing gas such for example as hydrogen.

The electrode base having the boride formed in and on it is then heated to about 200° C. which causes the boride to become very adherent and hydrophobic.

Experience reveals that about 200° C., that is between 150–250° C., is a preferred temperature range although the base may be heated up to about 300° C. effectively if proper care is employed. Heating the base to a temperature over about 300° C. is to be avoided since a quasi-sintering action occurs which detracts from the catalytic activity of the boride, for example, a base heated to 400° C. is completely dead.

A lower temperature, for example, about 100–150° C. may be used but requires a longer heating period.

In this simple and readily achieved manner, a novel electrode structure is formed comprising a porous electrically conductive base which carries within its pores and on its surface a large plurality of adherent active centers of the catalyst boride which possess the further unexpected characteristic of being hydrophobic.

The procedure, as described, is the same regardless of whether the porous base is carbon or nickel and irrespective of the specific soluble salt of cobalt or nickel selected for the first bath. Similarly, the borohydride may be any alkali borohydride, but preferably of sodium or potassium, without departing from the method described.

The electrode thus formed provides highly desirable results when utilized as the anode in both gas and liquid-gas cells as appears in the data reported below.

An alternative method of manufacturing electrode plaques to exploit the novel characteristics which I have discovered resulting from calcining the borides of nickel and cobalt, but which does not create the many internal catalytic centers described above, shall now be described.

In this procedure, which is admittedly less desirable for certain application, I react my aqueous solution of a salt of cobalt or nickel, of the type previously described, with the alkaline borohydride in a separate reactor vessel. A voluminous precipitate, black both in the case of nickel, boride and cobalt boride, is formed with the evolution of hydrogen. The boride is then filtered from the solution and washed free of the excess borohydride and salts. The boride precipitate, somewhat pasty in consistency, is then spread onto the surface of the porous electrode base as with a knife or doctor blade or by any other conventional spread technique. After spreading a relatively uniform coat of the boride on the electrode base, the coating is permitted to dry and the electrode base is heated in a non-oxidizing atmosphere to a temperature of about 200° C. as before. The electrode is then cooled and is ready for use in a fuel cell.

To further aid in the complete understanding of the present invention, the following examples are presented to exemplify rather than limit the practice thereof.

*Example I*

A test cell was assembled with an anode, prepared in accordance with the present invention, and a cathode, formed of a nickel base dipped into a solution of palladium black, sandwiched about an asbestos spacer soaked with 25 percent potassium hydroxide (6 N) electrolyte. The anode consisted of a porous nickel plaque dipped into a first solution of nickel acetate until saturated, then dipped into a second solution of potassium borohydride, and then calcined at 220° C. for three hours in a helium atmosphere. This resulted in an anode having 1.3 gms. of calcined nickel boride thereon and therein. The cell was operated at 78° C. using hydrogen as the fuel and oxygen as the oxidant. The cell provided an open circuit voltage of 1.0 volt. The voltage (E volts)-current density (I, amps/ft.$^2$) characteristic of the anode was:

| E | 0.84 | 0.79 | 0.71 | 0.62 |
|---|---|---|---|---|
| I | 17 | 34 | 68 | 102 |

*Example II*

A test cell was assembled with an anode, electrolyte, spacer and cathode prepared as in Example I. The cell was operated at 26° C. with hydrogen as fuel and oxygen as oxidant. The cell provided an open circuit voltage of 0.97 volt. The voltage (E, volts)-current density (I, amps/ft.$^2$) characteristic of the anode was:

| E | 0.75 | 0.70 | 0.65 | 0.52 |
|---|---|---|---|---|
| I | 17 | 25 | 34 | 68 |

*Example III*

A test cell was assembled with a cathode, formed by depositing palladium black on a nickel plaque, an asbestos spacer soaked with 25 percent potassium hydroxide (6 N) electrolyte, and an anode having 1.0 gram of nickel boride formed in and on a porous nickel plaque treated in accordance with the present invention. The cell was operated at 78° C. with hydrogen as fuel and oxygen as oxidant and provided an open circuit voltage of 1.0 volt. The voltage (E, volts)-current density (I, amps/ft.$^2$) characteristic of the anode was:

| E | 0.77 | 0.70 | 0.61 | 0.56 |
|---|---|---|---|---|
| I | 17 | 34 | 68 | 102 |

*Example IV*

A test cell was assembled with an anode, electrolyte, spacer, and cathode prepared as in Example III. The cell was operated at 26° C. with hydrogen as fuel and oxygen as oxidant. The cell provided an open circuit voltage of 0.96 volt at 26° C. and the voltage (E, volts)-current density (I, amps/ft.$^2$) characteristic of the anode was:

| E | 0.60 | 0.54 | 0.48 | 0.34 |
|---|---|---|---|---|
| I | 17 | 25 | 34 | 68 |

*Example V*

A nickel boride slurry was formed by reacting nickel chloride with sodium borohydride in a reactor and separating the nickel boride from the soluble reaction salts. The slurry was spread on one surface of a circular asbestos spacer (five inches in diameter) until 4.0 grams of nickel boride was uniformly disposed thereon. The spacer was then calcined at 220° C. in an atmosphere of helium for three hours. A cathode, formed of a nickel plaque carrying palladium black, was abutted against the non-boride carrying surface of the spacer and a nickel plaque and wire screen were laid over the boride surface for electrical conductivity. The spacer was then saturated with a 25 percent solution of potassium hydroxide (6 N) electrolyte. The resultant cell was operated at 82° C. with hydrogen and oxygen and produced an open circuit voltage of 1.03 volts. The voltage (E, volts)-current density (I, amps/ft.$^2$) characteristic of the anode was:

| E | 0.77 | 0.65 | 0.52 | 0.35 |
|---|---|---|---|---|
| I | 15 | 30 | 45 | 60 |

It has been further discovered that an electrode prepared in accordance with the invention may also be used as a cathode if desired with satisfactory results although the principal advantages of my method are more prevalent when the electrode is utilized as an anode.

From the foregoing it becomes apparent that a new and improved electrode and methods of preparing the same have been herein described which meet the aforestated objectives to a remarkably unexpected extent. It is, of course, understood that such modifications, applications and alterations as may readily occur to one skilled in this art upon being confronted with the present disclosure are within the spirit of the present invention which is defined by and limited only by the scope of the claim appended hereto.

The embodiments of the invention in which an exclusive property or privilege is claimed are defined as follows:

The method of preparing a hydrophobic electrode for fuel cells comprising the steps of immersing a porous electrically conductive electrode base selected from the group consisting of carbon and nickel into an aqueous solution containing a dissolved salt selected from the group consisting of chlorides, bromides, acetates, and nitrates of a metal selected from the group consisting of cobalt and nickel; removing said base from said solution; immersing said base into a solution of a borohydride of a metal selected from the group consisting of sodium and potassium; removing said electrode base from the said solution; rinsing said base with water; heating said base in a non-oxidizing atmosphere to a temperature of from about 150° C. to about 250° C. until said boride adheres to said base; cooling said base; and utilizing said hydrophobic electrode as a current generating electrode in a fuel cell.

References Cited by the Examiner

UNITED STATES PATENTS 1,255,590  2/18  Ellis _____ 252—432
2,717,889  9/55  Feller et al. _____ 252—432

FOREIGN PATENTS 2,306  1914  Great Britain.
127,242  4/60  Russia.

OTHER REFERENCES

Chemical Abstracts, column 10, 699, 1958.
Ind. & Eng. Chemistry, vol. 44, May 1952, pages 1006–1010.

JOHN H. MACK, *Primary Examiner.*

JOHN R. SPECK, WINSTON A. DOUGLAS,
*Examiners.*